(12) United States Patent
Andreini

(10) Patent No.: US 8,210,150 B2
(45) Date of Patent: Jul. 3, 2012

(54) FRICTIONLESS HYBRID THERMIONIC ROTARY ENGINE

(76) Inventor: Dino Andreini, Santa Margherita-Lucca (IT)

(*) Notice: Subject to any disclaimer, the term of this patent is extended or adjusted under 35 U.S.C. 154(b) by 225 days.

(21) Appl. No.: 12/676,893

(22) PCT Filed: Mar. 12, 2008

(86) PCT No.: PCT/IT2008/000164
§ 371 (c)(1),
(2), (4) Date: Mar. 6, 2010

(87) PCT Pub. No.: WO2009/047818
PCT Pub. Date: Apr. 16, 2009

(65) Prior Publication Data
US 2010/0300399 A1    Dec. 2, 2010

(30) Foreign Application Priority Data
Oct. 12, 2007  (IT) .............................. RM2007A0539

(51) Int. Cl.
*F02B 53/12*  (2006.01)
*F02B 33/44*  (2006.01)

(52) U.S. Cl. ...................................... 123/210; 60/605.1

(58) Field of Classification Search ................. 60/605.1; 123/210; 418/61.2
See application file for complete search history.

(56) References Cited

U.S. PATENT DOCUMENTS

| | | | | |
|---|---|---|---|---|
| 3,173,406 A | * | 3/1965 | Campos | 418/61.2 |
| 3,395,967 A | * | 8/1968 | Karr | 60/202 |
| 3,690,784 A | * | 9/1972 | Farrow | 415/54.1 |
| 4,192,634 A | * | 3/1980 | Campos et al. | 418/61.2 |
| 4,417,862 A | * | 11/1983 | Fenton | 418/61.2 |
| 5,839,270 A | * | 11/1998 | Jirnov et al. | 60/775 |
| 2005/0155350 A1 | | 7/2005 | Rider | |
| 2006/0138896 A1 | | 6/2006 | Makansi | |

FOREIGN PATENT DOCUMENTS

CA      2 379 260 A1    10/2003

OTHER PUBLICATIONS

International Search Report, Aug. 20, 2008, from International Phase of the instant application.

* cited by examiner

*Primary Examiner* — Mary A Davis
(74) *Attorney, Agent, or Firm* — Themis Law

(57) ABSTRACT

A motor according to the invention includes a combustion chamber; a central rotor disposed within the combustion chamber; a shaft, which engages the rotor longitudinally and extends from the combustion chamber in opposite directions; and a proximal rotor and a distal rotor, which are coupled to the shaft in symmetrically opposite positions and have passages defined thereon to receive at least some of the exhaust gas exiting the combustion chamber and impart a vertical motion to that exhaust gas. After exiting the proximal and distal rotors, the exhaust gas is directed to an interspace between the shaft and a housing of the motor and forms pneumatic bearings between the shaft and the housing, which maintain the shaft in a frictionless suspended position during operation of the motor. In one embodiment, some of the exhaust gas energizes batteries disposed around the motor.

15 Claims, 16 Drawing Sheets

Dynamic force rising from a comet at tracer speed

"ROTODIN"

Combustion chamber having a dynamic force like a circular comet track

Development of energy - like a ram - of a celestial body

Various sequences of dynamic force directions in a peripheral vortex to cause a rotary motion

THERMIONIC ROTODIN

Longitudinal section

Scale 1 : 4

THERMIONIC ROTODIN

Cross section

EXPLOSION STROKE

Longitudinal section

EXHAUST STROKE

Longitudinal section

CAVITY OF THE ROTOR

Spoon rims in evidence, largest rim on the loading side, smallest rim on the exhaust side

ELECTRIC SYNOPTIC DIAGRAM

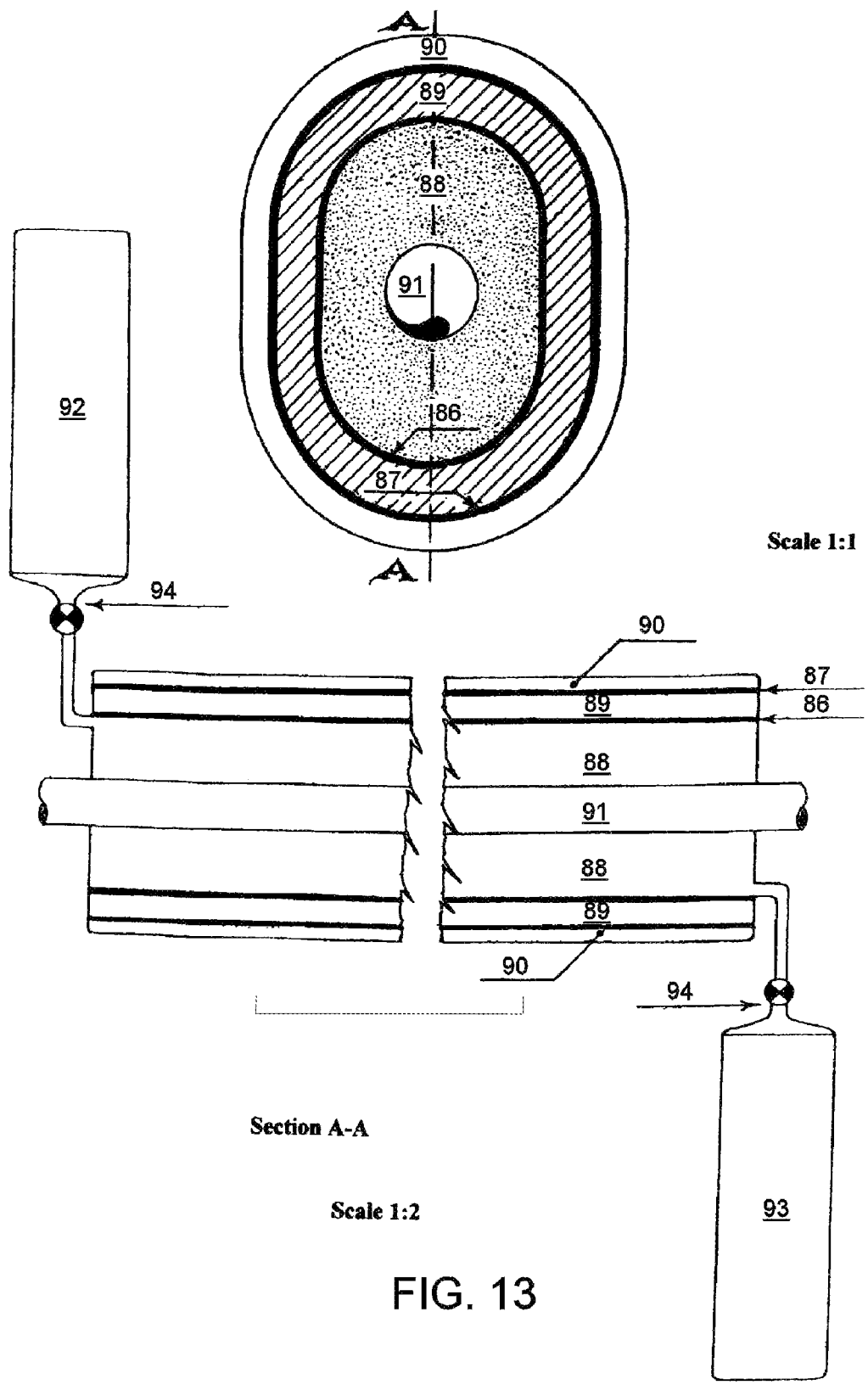

PHOTOVOLTAIC CELL PANELS TOGETHER WITH
STORAGE-GENERATOR THERMIONIC CELLS

Type 1

Type 2

Type 3

Type 4

KINEMATIC MOTOR PUMP
FIG. 18
FIG. 19
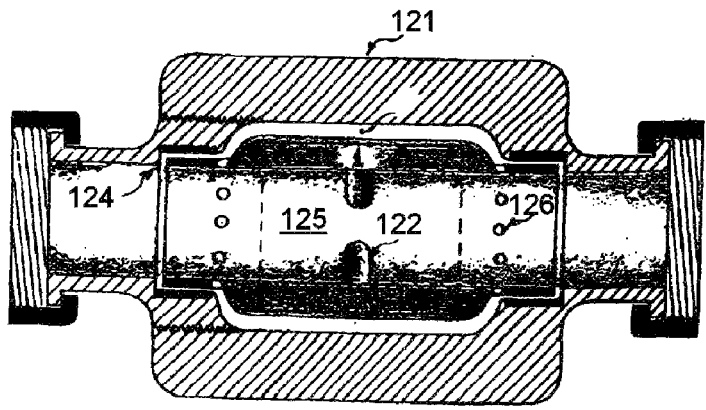
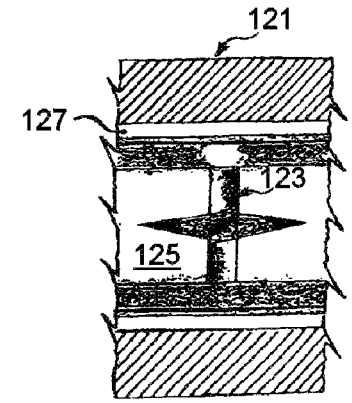
Longitudinal section    Scale 1:1
FIG. 20
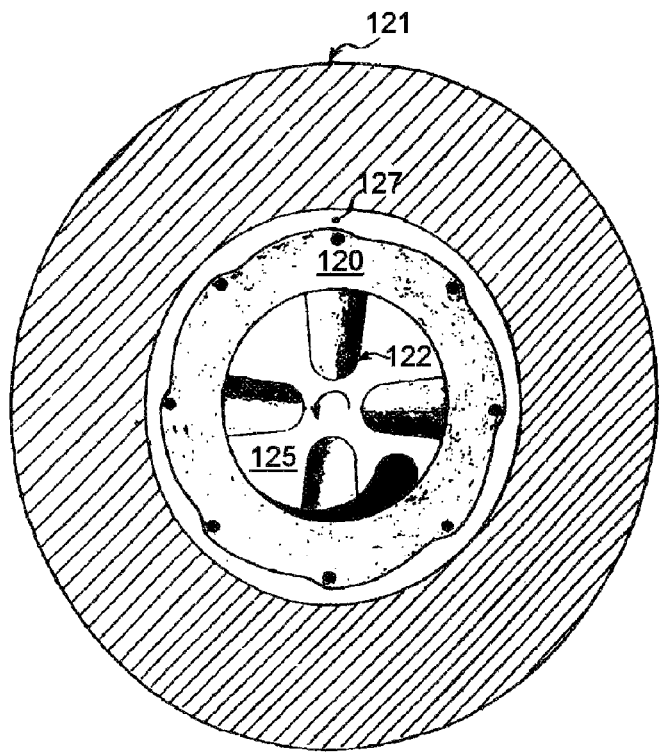
Cross section    Scale 1 x 2

SCROLL SOUND WAVES CONVEYOR

Scale 1:2

MAGNETIC SLIPPING SPEED REDUCER WORKING AS A FRICTIONLESS SELF-CENTRING SPHERICAL VORTEX

FRICTIONLESS HYBRID THERMIONIC ROTARY ENGINE

FIELD OF THE INVENTION

The present invention relates to a motor. In one embodiment, the present invention relates to an engine having pneumatic bearings and recovery of heat from the exhaust gas.

BACKGROUND OF THE INVENTION

A motor according to the invention, named thermionic Rotodin herein, derives from the observation of the dynamic force rising from a comet at tracer speed and caused by an astral nucleus which is quantified by a numerical atomic mass (FIGS. 1-2). In a similar way the combustion chamber of the Rotodin causes the development of a dynamic force like a ram from a linear motion—just like the action of a comet—to a rotatory uniform curvilinear motion of dynamic force, so as to create artificially a peripheral vortex of cylindrical torsion force, produced by the focusing of thermodynamic energy focused in contractive constriction which generates a speed in a time in a space. By analyzing the direction of a contemporaneous set of forces required to give the Rotodin a rotary motion (FIG. 3), you can see various sequences of dynamic force directions of a peripheral vortex.

At the letter "F" we have the optimal phase where the contemporaneous action of three forces I-R-U takes place; these forces give the rotor the greatest resultant and cause a better development of a rotary energetic motion.

I will try to underline the "U" force. This one is generated in the peripheral vortex as a rear torsion dynamic motion, therefore its outlet to the exhaust is unfavorable, so that the energy held back in the explosion chamber gives the rotor a greater thrust.

SUMMARY OF THE INVENTION

The frictionless Rotodin with turbosupercharger (FIG. 5 "Cross section" and legend) is derived from a cylindrical peripheral vortex of energy in thermodynamic contractive constriction and has constant volume chambers as well as a sequence of strokes with a stellar rotary subdivision of 120°: loading stroke, explosion stroke and exhaust stroke.

The Rotodin is conceived for the thermal combustion of all hydrocarbons and of hydrogen and oxygen, which being introduced into a torsional combustion vortex of energy in contractive constriction transform the expanding thermal energy into dynamic energy directed to the axial center of the rotary vortex. The expanding heat dissipated on the peripheral vortex and caused by the combustion is recovered and recycled into a complex thermal vortex (a co-generating combined-cycle thermo-turbosupercharged electrodynamic vortex) with storage of electric energy in the thermionic cells.

The rotary axis of the Rotodin (FIG. 9 "Longitudinal section" and legend) and so the axial frictionless support are held up in suspension without any sliding contacts by a double pneumatic bearing made of two opposed vortexes and supplied with the exhaust gas. The vortexes are self-cleaning, because the gas transiting in/out and, contemporaneously, the axial rotation have high speed. On the rotor cone of the double pneumatic vortex-shaped bearing we can find the engraving of grooves with the direction of a screw thread suited to increase the axial torsion force still further. The two axial opposed vortexes work as two miniturbines, but the in/out direction of the gas of the whirling cone is reverse compared to the normal turbines, so to force the escaping gas into a narrowing on the conical centering vertex, in order to contain mostly the pneumatic bearing effect of the gas. As the rotation speed of the rotor goes higher, the formation of a pneumatic bearing in the slack between fixed surface and rotary surface increases. As the torsional force increases, the bearing zone is clearer and an invisible slack takes shape more and more. Since on the shaft there are no sealing systems caused by sliding surfaces, in order to avoid that the exhaust gas escaping from the vortex-shaped bearing goes into the power electric motor, it is necessary to have on the shaft a frictionless sealing joint (39 at FIG. 9 "Longitudinal section" and legend) which consists of an axial plug microturbine to reverse the direction of the exhaust gas and introduce it into the peripheral holes on the axis which lead to one greater hole at the center of the axis. By this way the gas runs through the whole rotor at the center and comes out of the axis through peripheral holes, and in the meanwhile will mix with the other gas escaping from the other pneumatic bearing located on the other side. The axial rotary surfaces and the rotor must undergo a hardening treatment: ceramic or carbon-diamond.

BRIEF DESCRIPTION OF THE DRAWINGS

FIGS. 12 and 13 illustrate a power storage and generation cell in a motor according to the invention.

FIGS. 18-20 illustrate different views of a kinematic pump in a motor according to the invention.

DETAILED DESCRIPTION OF EMBODIMENTS OF THE INVENTION

1) Rotodin

Thermodynamic Combustion Rotary Engine

Figure 1:
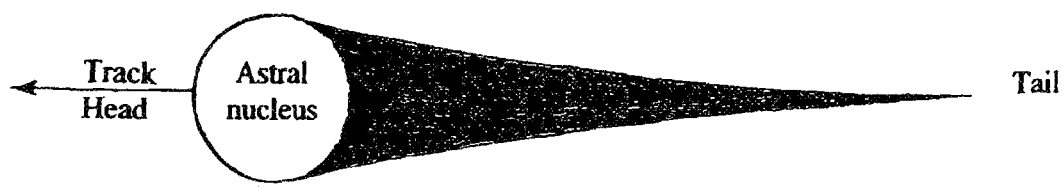
FIG. 1 illustrates a dynamic force arising from a comet at tracer speed.
Figure 2:
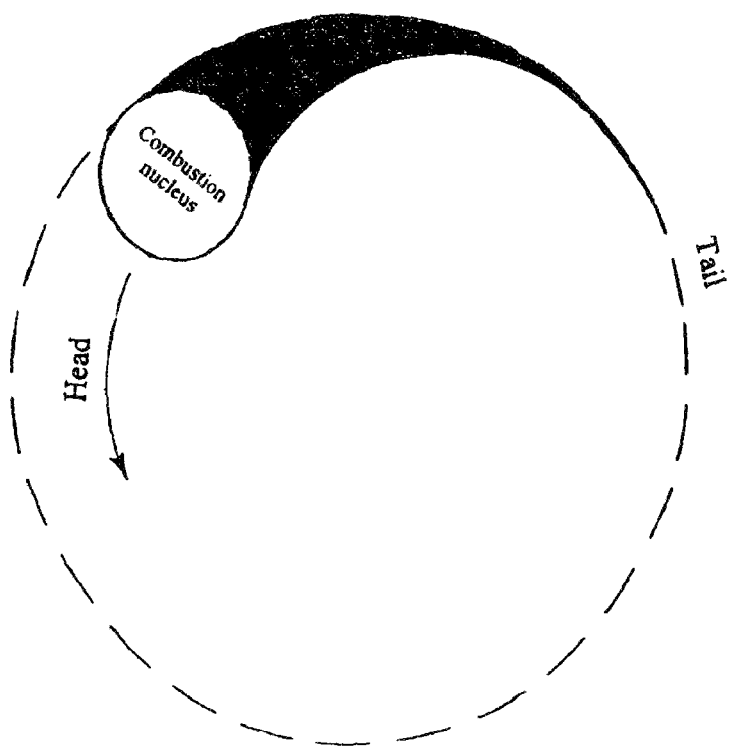
FIG. 2 illustrates schematically a combustion chamber having a dynamic force similar to a circular comet track.
Figure 3:
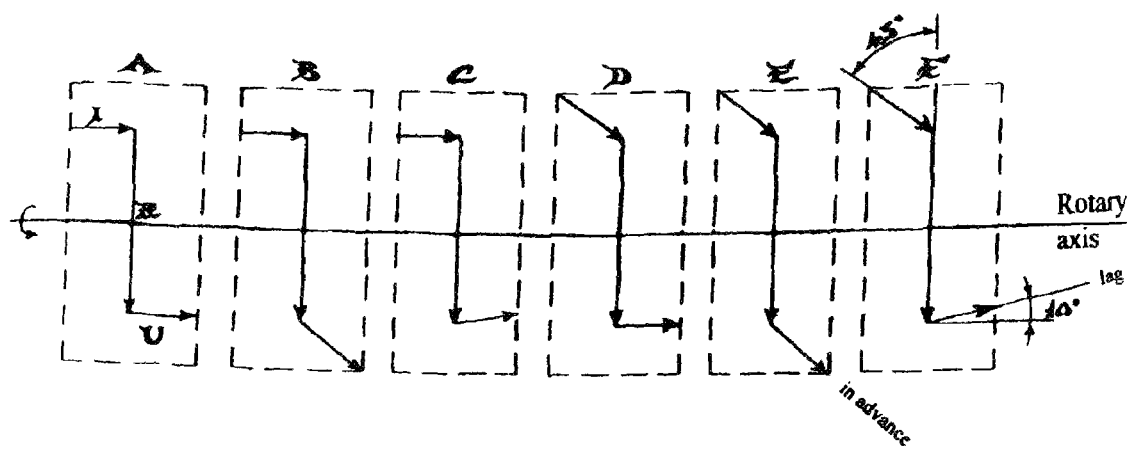
FIG. 3 illustrates various sequences of dynamic force directions in a peripheral vortex to cause a rotary motion.
Figure 4:
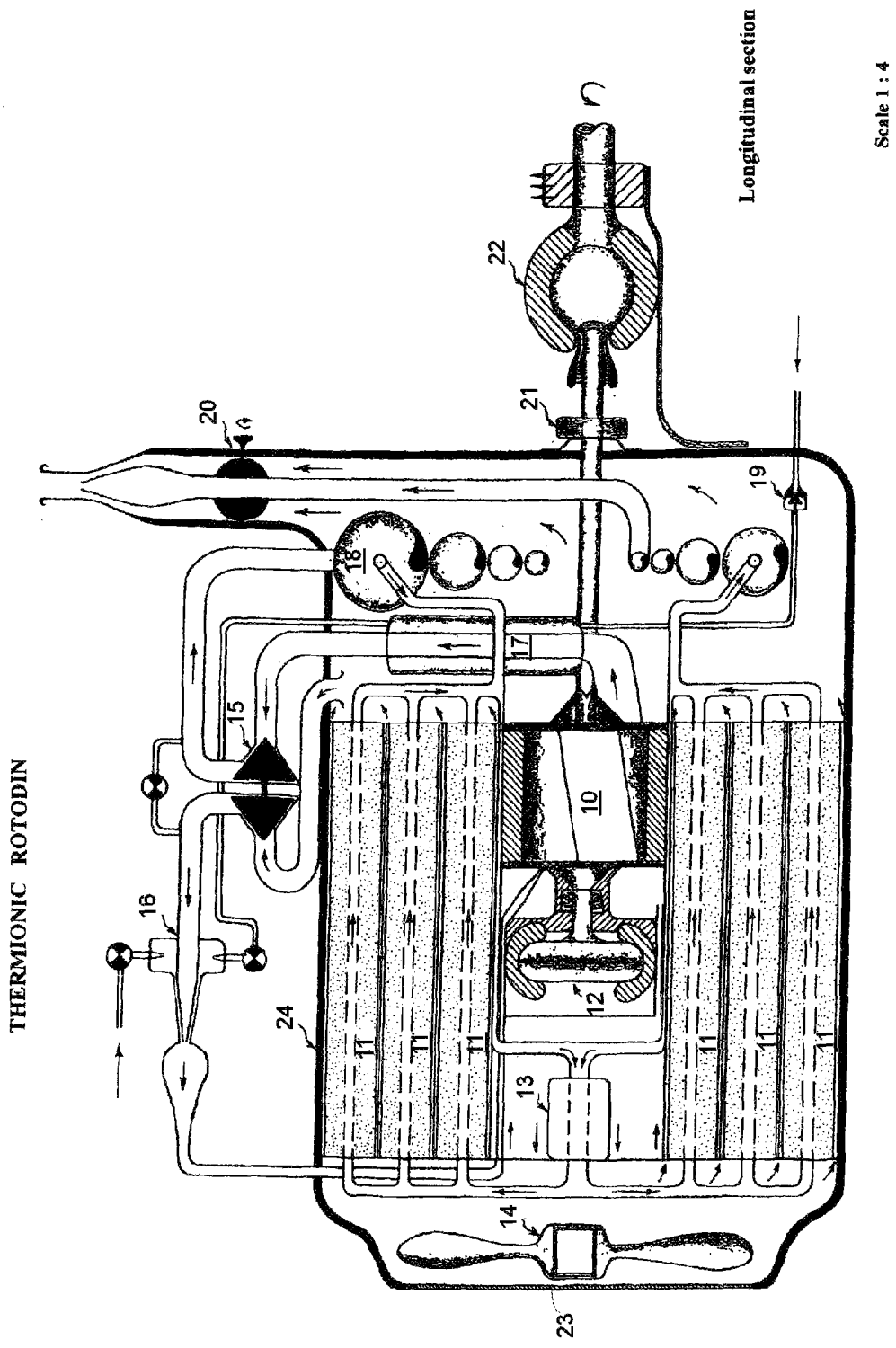
FIG. 4 illustrates a cross-section of a motor according to an embodiment of the invention.
Figure 5:
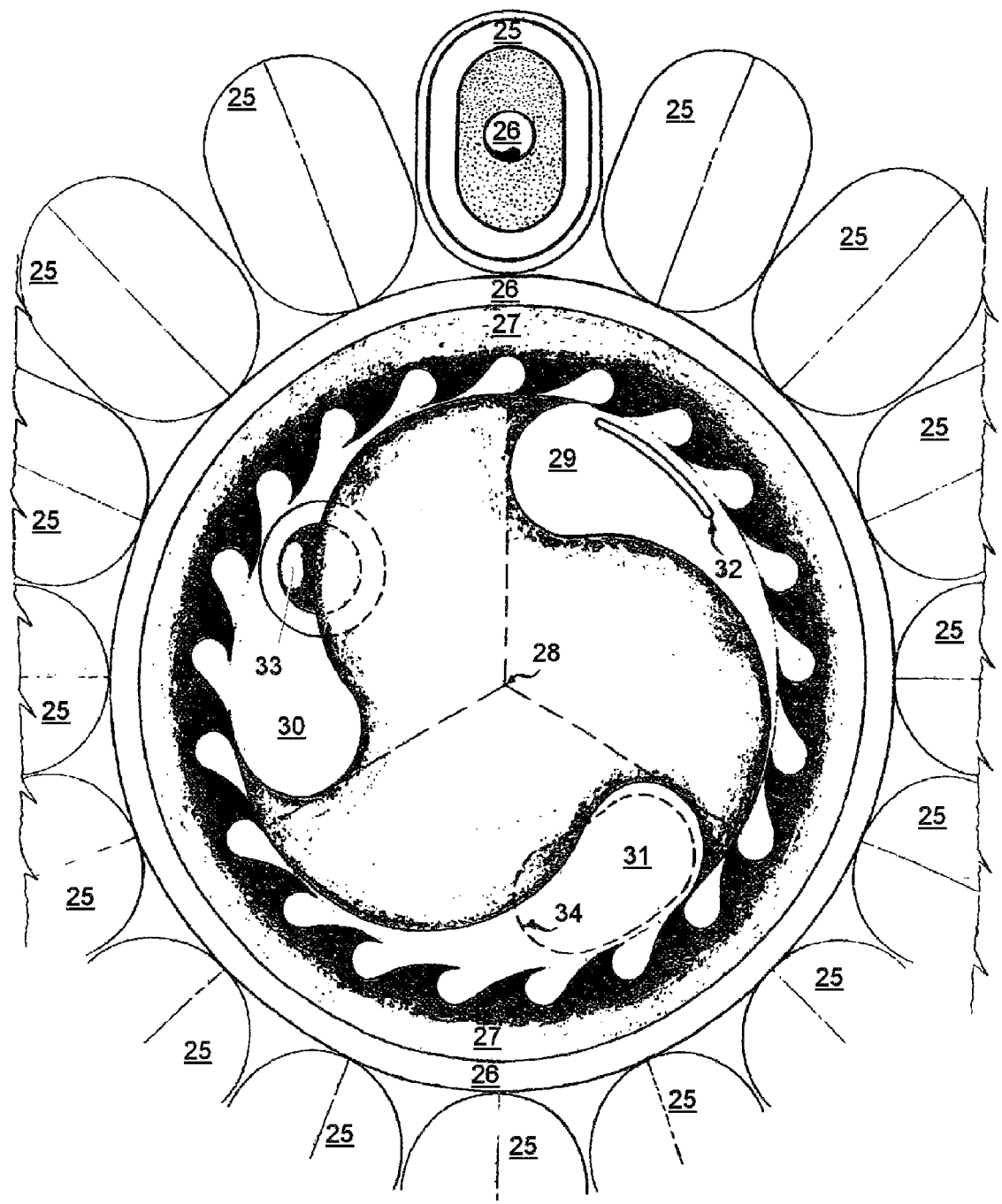
FIG. 5 illustrates a cross-section the combustion chamber in the motor of FIG. 4.

FIG. 4 "Longitudinal Section" and Legend and FIG. 5 "Cross Section" and Legend

The thermodynamic combustion engine has three rotary working strokes in a a star pattern split up into three subdivisions of 120°. The rotary sequence of the strokes going to an anticlockwise direction is the following: loading stroke, explosion stroke, exhaust stroke.

Loading Stroke

Figure 6:
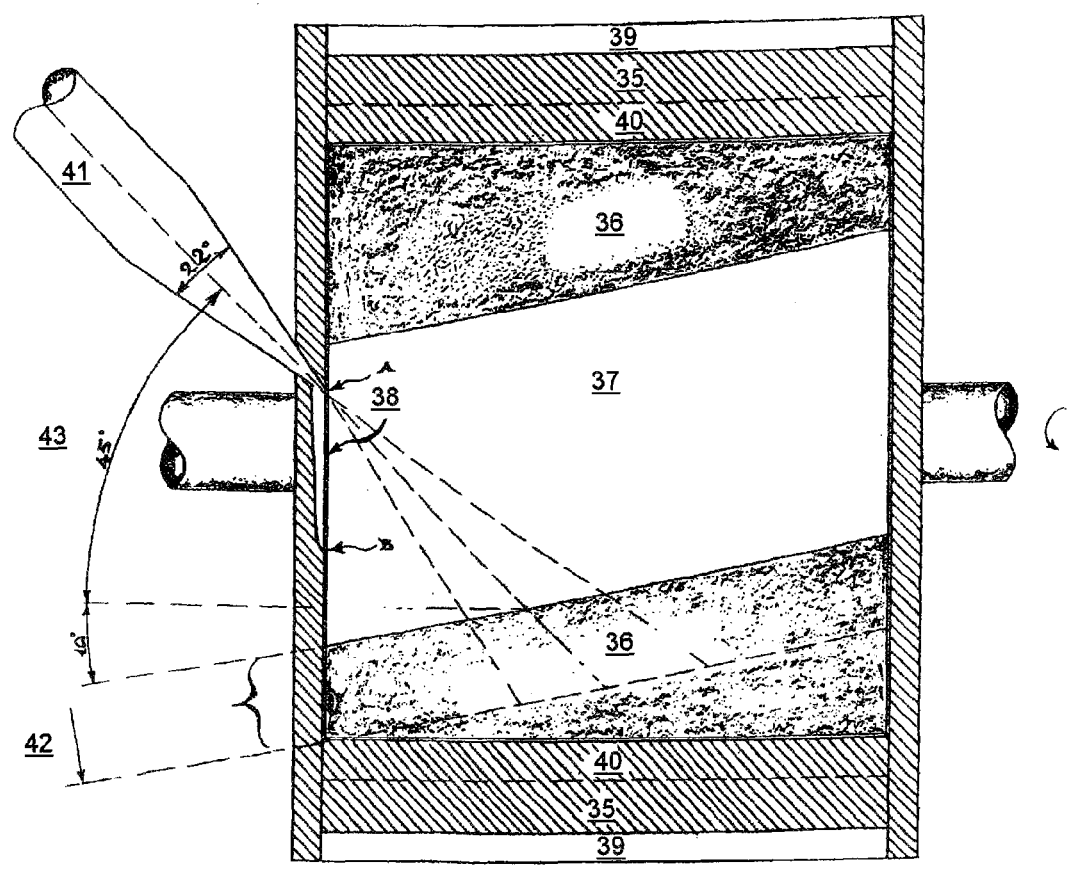
FIG. 6 illustrates schematically fuel injection in a motor according to the invention.

FIG. 5 "Cross Section" and Legend and FIG. 6 "Longitudinal Section" and Legend

The sectioned stator shows from its internal view the entire rotor with the combustion chamber inclined of 10°. On the left of the drawing we can see an injector that introduces the concentrated fuel at full speed with an inclination of 55° bumping into the center of the cavity. Between A and B on the left of the chamber—on the stator surface—we can see a loading port formed as a buttonhole groove, in order to extend the time of loading during rotation, even if the fuel introduction in front of the injector is blocked by the rotor sequence.

Explosion Stroke

Figure 7:
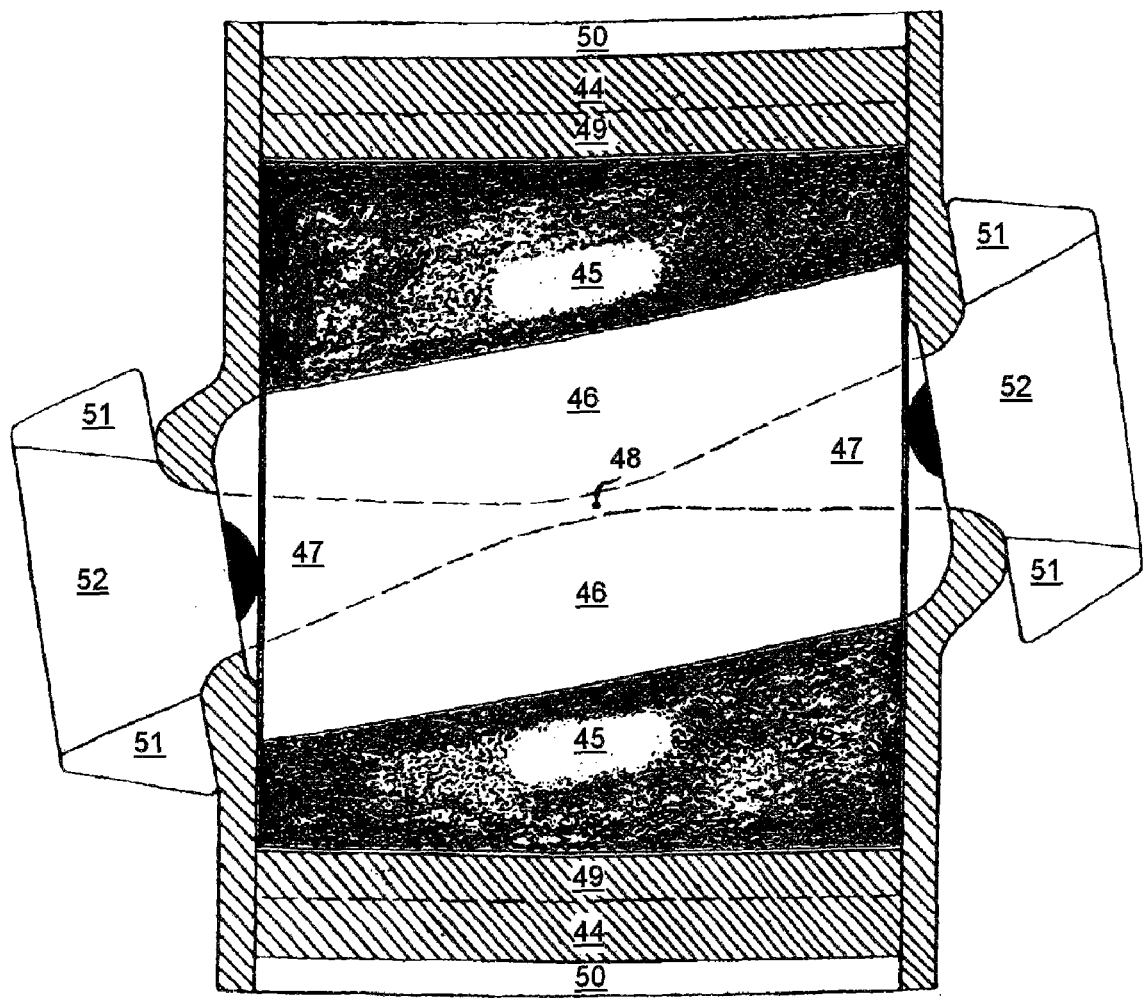
FIG. 7 illustrates schematically the shape of the magnetic field in the explosion chamber in a motor according to the invention.

FIG. 5 "Cross Section" and Legend and FIG. 7 "Longitudinal Section" and Legend

The stator is the container of the peripheral vortex and it has cavities characterized by a facing toothing (27 at FIG. 5), which has a direction of movement in the same direction as the expanding force, so as to link the force to the cylindrical internal surface of the stator by projecting the force with a torsional whirling throw.

In conclusion the several cavities are hooking minichambers of the stator and they are just like the ringed crown of a whirling uniform motion system, as a chain. The external surface of the stator has an interspace (26 at FIG. 5) where a thermoconductive fluid will flow for the recovery of thermal energy.

In the combustion chamber (FIG. 7 "Longitudinal section") we can see the Rotodin with the sectioned stator and the entire rotor in its internal view with the combustion cavity inclined of 10° between anode and cathode working as polarized magnetic spark gaps.

The poles are the gaps of opposed high tension transformers, therefore they produce conical vortexes, whose vertexes cause a magnetic force focusing. The solenoids consist of a greater number of turns on the side of focusing.

Figure 10:
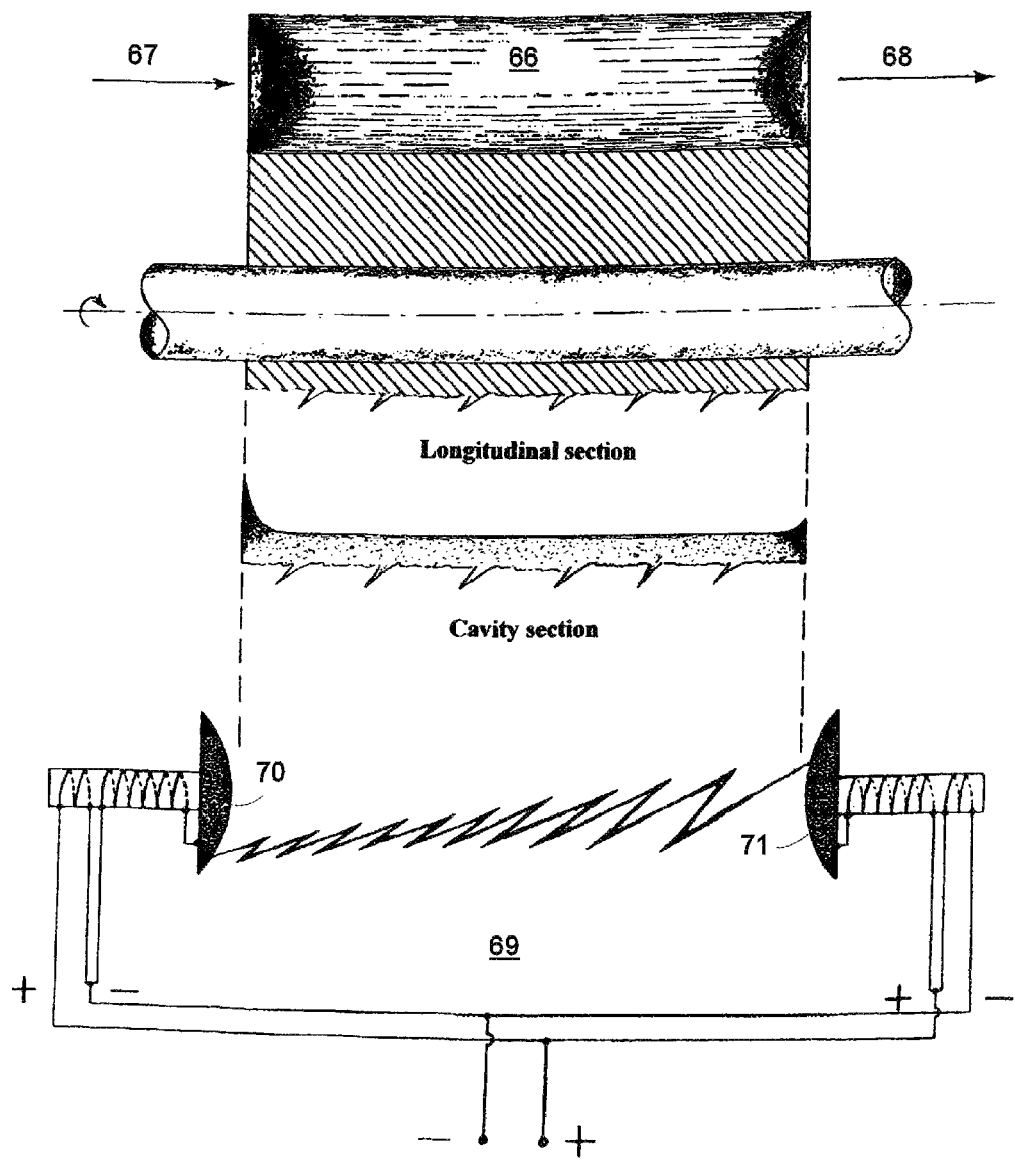
FIG. 10 illustrates spark generation in a motor according to the invention.

The polar spark gap heads give off concentrated arcs made of electric jump sparks between anode and cathode, therefore it is produced a concentrated crossing of ions, so that the ionic arcs are more concentrated at the focused center caused by a magnetic field. We can see a further particular in the FIG. 10 "Longitudinal section". In the explosion chamber, inside the cavity of the rotor (66) we can see spoon rims: the rim on the loading side is larger (67) than the one on the exhaust side (68).

The objective is to form a cavity with a side partial locking, so as to contain the core of the expanding force at torsional whirling speed.

Below the figure it is represented a simple diagram of the electric arc striking system and at the same time the creation of an anode-cathode magnetic field. The intensity of current of electrons that causes the jump spark is made of the astronomic number of electrons that creates it and it is the same number of electrons going through the solenoids. By this way the speed of electrons crossing the solenoids creates this very instant an anode-cathode magnetic field proportional to the current in transit.

The surfaces of the two opposed polar spark gap heads form the narrow-necked truncated cone gaps of the solenoids of anode and cathode having a small surface head. They cause a narrowing of the magnetic lines beam already present in the gap of the solenoid not far from the outlet near the polar head. The magnetic lines produce an increase in intensity of the magnetic field that is more concentrated in outlet from the polar heads.

During the conical focusing of lines of magnetic force concentrated at the center of the chamber, it is created a ringed narrowing (48 at FIG. 7 "Longitudinal section" and legend) of the concentrated beam of magnetic field lines which pass through the narrowing. Therefore the lines of magnetic force are the vector that better transfers into a narrowing the electric arc jump sparks, which are made of ionized electrons that go from the anode to the cathode in a better more conductive way.

Introducing hydrocarbons, and most of all $H_2O$ vapor, in the explosion chamber and concurrent to the considerable polarized ionizing flux between anode and cathode, it is produced a phenomenon of electrolysis into a magnetic electrolyte concentrated at the center of the chamber, where the molecules of hydrocarbons and $H_2O$ are more concentrated. But the electronic bombardment—that is a bombardment of ionized electrons—concentrated on the water vaporized molecule causes a molecular hot fission separating the hydrogen from the oxygen. The hydrocarbons fuel supply can be disconnected, so that the hydrogen and oxygen supply only will work.

The molecular separation causes a combustion, because the hydrogen will immediately find the oxygen through a contemporaneous striking of electric jump sparks and a very high concentrated temperature is produced like a partial state of plasma, which being in contractive constriction during combustion causes a considerable expanding thermodynamic energy. Owing to the fission it is produced a molecular explosion which generates an expanding energy coming out of an atomic fission.

Exhaust Stroke

Figure 8:
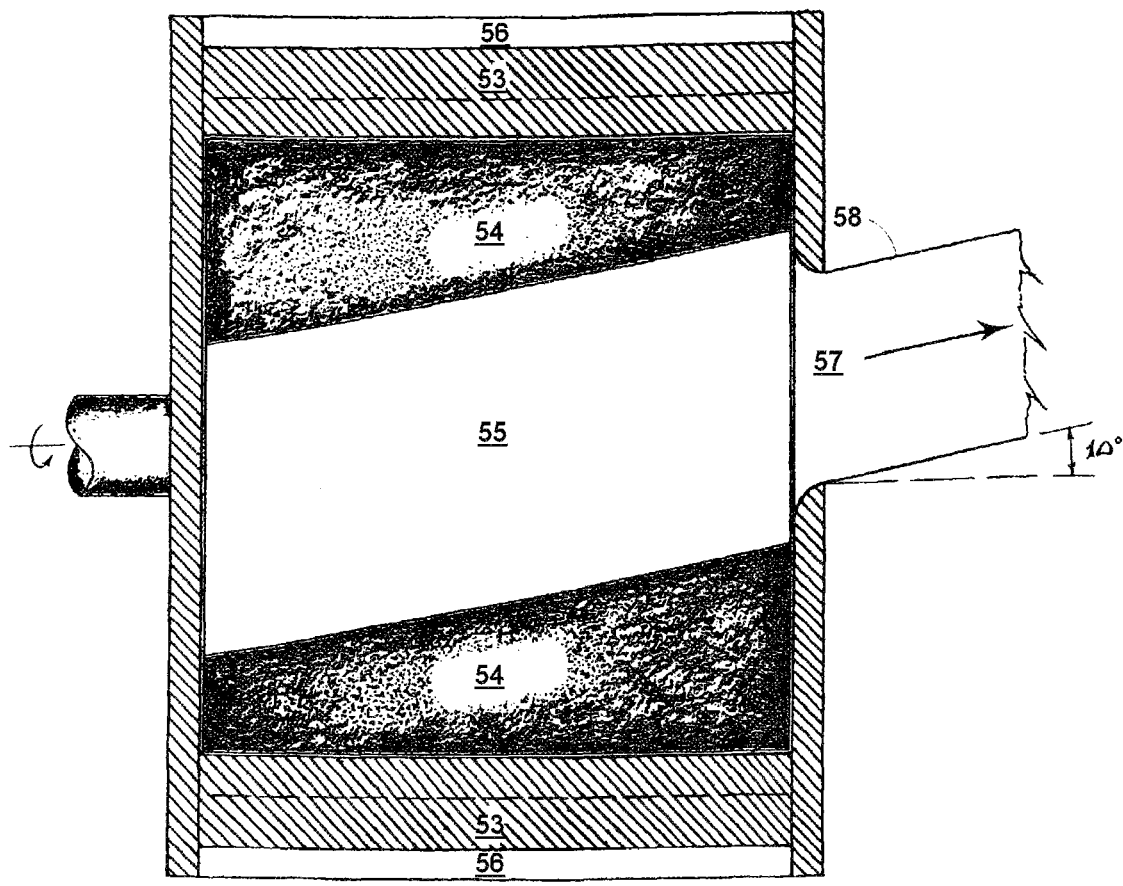
FIG. 8 illustrates the exhaust stroke in a motor according to the invention.

FIG. 5 "Cross Section" and Legend and FIG. 8 "Longitudinal Section" and Legend The sectioned stator shows from its internal view the entire rotor with the combustion chamber inclined of 10°. The considerable expanding force in contractive constriction finds a way out in the exhaust stroke. The high speed of the burnt outgoing gas causes a helical thrust, after dragging into the cavity, which runs through the exhaust tunnel with the same inclination of 10°. Therefore, the outgoing gas having a deflected speed helps to generate a motion, a side thrust of about 90°, which is torsional on the peripheral vortex.

2) Thermionic Cell for the Production and Storage of Electric Energy

FIG. 5 "Cross Section" and Legend and FIG. 12 "A-A Section" and Legend

The thermionic cell releases energy of electro-ionic origin from the atom and it consists of doped alkaline minerals. It is made of a hollow anode where any emission of heat can go through. Inside the anode there is an atomic fluid mass containing alkaline minerals excessively doped. The thermoconductive manifold goes through the center of the anode and so it transmits heat to the atomic fluid mass that begins to ferment. The fermentation in a fluid produces mainly the phenomenon of ion detachment, because the atoms in a fluid mass move and get excited, so that every alkaline atom will continuously change its position in the fluid in a space in a time at a certain speed depending on temperature.

Therefore increasing temperature up to a certain limit, a greater number of ions will be released from the anode, consequently more energy is produced depending on the astronomic mass number of atoms which constitute the anode itself.

The ionic emission from the anode radiates in the alkaline solid dielectric electrolyte, which is accumulator of ionic energy.

The dielectric electrolyte is located between anode and cathode. The cathode consists of alkaline minerals with lacking doped ions. With cooling it becomes oxidized and dissipates heat, when air, oxygen go through.

Therefore it is produced a thermionic conduction with variable temperature on the distance from the anode to the cathode and so while flowing down like a cascade towards a colder temperature. Since the temperature stimulates the emission of electrons, that is ions, from the atomic fluid mass of the thermionic cell in the anode, after a long operational period the fluid will lose its ions, therefore the exhausted fluid must be substituted by a new alkaline restored one to be introduced again.

Even in nuclear powers for electric energy production the fuel runs out as time goes by. The enriched uranium bars lose their emission of energy after a long operational period, because energy is generated from the splitting of the atomic nucleuses of the uranium bars, so the atomic fuel runs out with time and shall be substituted.

Even if we stop supplying heat, the thermionic cell gives off ionic energy in proportion to its atomic storage fluid mass of which it is constituted.

Figure 14:
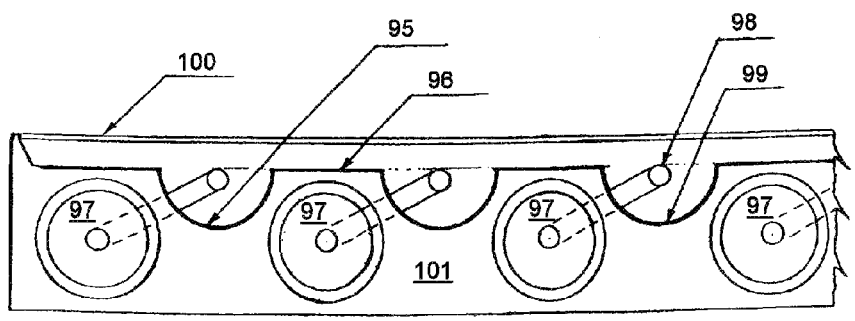
FIGS. 14 and 15 illustrate a combination of photovoltaic cells together with power storage and generation cells in a motor according to the invention.
Figure 15:
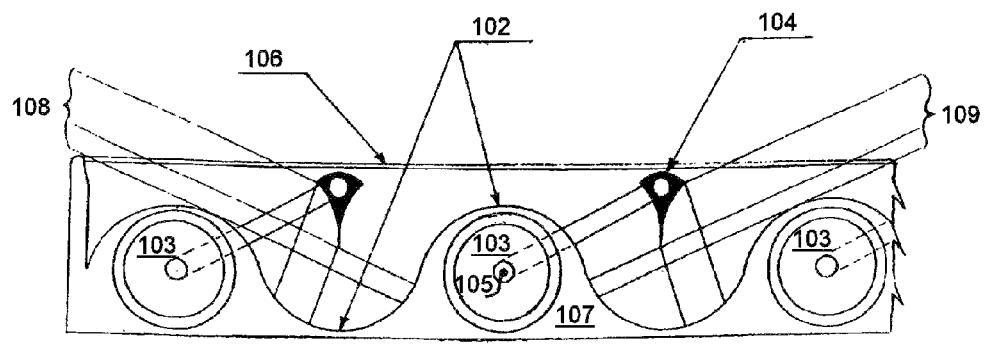
Figure 16:
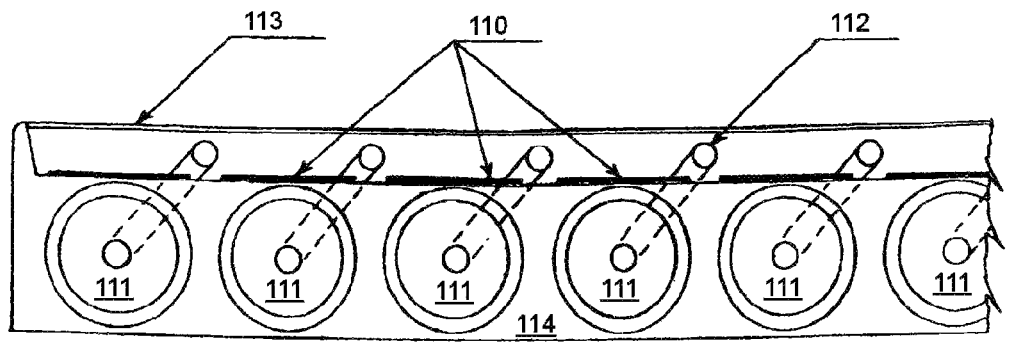
FIGS. 16 and 17 further illustrate a combination of photovoltaic cells together with power storage and generation cells in a motor according to the invention.
Figure 17:
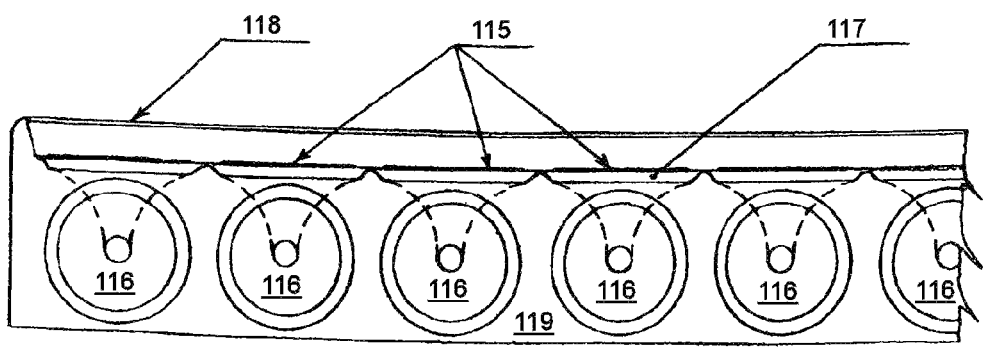

The thermionic cell can consist also of a sandwich plane panel having the whole surface of the anode side next to a heat source and the other side, the cathode side, is made colder by a flux of upward circulating air. Here below you can see four types of photovoltaic cell panels together with storage-generator thermionic cells, represented as follows:

| FIG. 14 | Type 1: | Linear and curvilinear panel collecting energy |
| FIG. 15 | Type 2: | Curvilinear panel collecting energy |
| FIG. 16 | Type 3: | Linear panel collecting energy |
| FIG. 17 | Type 4: | Thermoconductive panel collecting energy |

In particular the panel of type 2 is made of a parabolic manifold with the purpose to collect the reflecting ray, because a ray bounces repeatedly between the concave surface of the manifold and the partially convex and partially concave surface of the photovoltaic cell. Besides, the natural inclination of the panel position allows a natural circulation of the anodic fluid and the expulsion of heat, air coming up from the cathodic cavity. On 15 Aug. 2006 I made an experiment on an alkaline "Duracell" pile of 1.5 Volt: uncharged pile at the room temperature of 25° C. with residual voltage of 0.4 Volt.

By warming the pile the temperature increases and at the same time the voltage increases of 0.2 Volt and totally the voltage becomes 0.6 Volt.

On 16 Aug. 2006 I made another experiment on an alkaline "Duracell" pile of 1.5 Volt: uncharged pile at the room temperature of 25° C. with residual voltage of 0.8 Volt.

I tried to annul the voltage by connecting the pile under short circuit for three hours.

As soon as I opened the circuit, I controlled the residual voltage and found that it had gone down to 0.4 Volt. In a short time the voltage increased of 0.2 Volt and totally it was 0.6 Volt and became steady.

Therefore by warming the pile for some minutes the voltage increases gradually up to 0.8 Volt: the voltage value becomes again just as it was at the beginning of the experiment. The phenomenon which takes place in the pile after three hours passed under short circuit is the following: the pile has a voltage of 0.4 Volt, but it should be zero Volt, because no energy is accumulated therein.

The residual voltage of an uncharged pile is due to the atomic structure of alkaline minerals, which in their dynamics can give off and retain ions, just like a mineral that radiates radioactivity. It will take a long time to annul the natural ionic emission of alkaline minerals under a short circuit.

Since the pile has got ionic conduction from the anode to the cathode, when it is heated as a consequence we have an increase in the anode temperature, so that a greater number of ions is released from the anode and goes towards the cathode producing an increase in voltage at poles. This fact takes place because the atoms, which form the anode, are stressed by an increase in temperature.

As regards the thermionic cell for energy storage and production I have tried to understand the phenomenon which happens inside the anode material thickness and in a dielectric electrolyte, which consist of doped alkaline minerals: warming up the anode, this one absorbs heat and the fluid begins to ferment.

From the center of the anode, where heat can be transmitted, the ionic source starts and here it is produced and generated a great quantity of ions, in proportion to the heat absorbed by the anode and the astronomic mass number of atoms which form the anode.

The thermal conduction of the manifold is transmitted to the fluid anode, which consists of doped alkaline minerals and begins to ferment. The atoms shift into the anode and change continuously their position.

The cathode has the following purpose: when it becomes oxidized through the air, oxygen in transit therein, it takes away heat by dissipating it, so it absorbs ions.

This phenomenon is favored by the thermoconduction in the running direction of heat, which is dissipated from a superior value of temperature to a decreasing lower value of temperature. As the value of temperature decreases more and more—going down like a fall—, the efficiency will be higher, because it is favored the electroionic conduction.

The direction of the thermoconduction favors the electric conduction of ions, which are introduced into the circuit of use depending on the requested quantity.

3) Electric Motor

Figure 9:
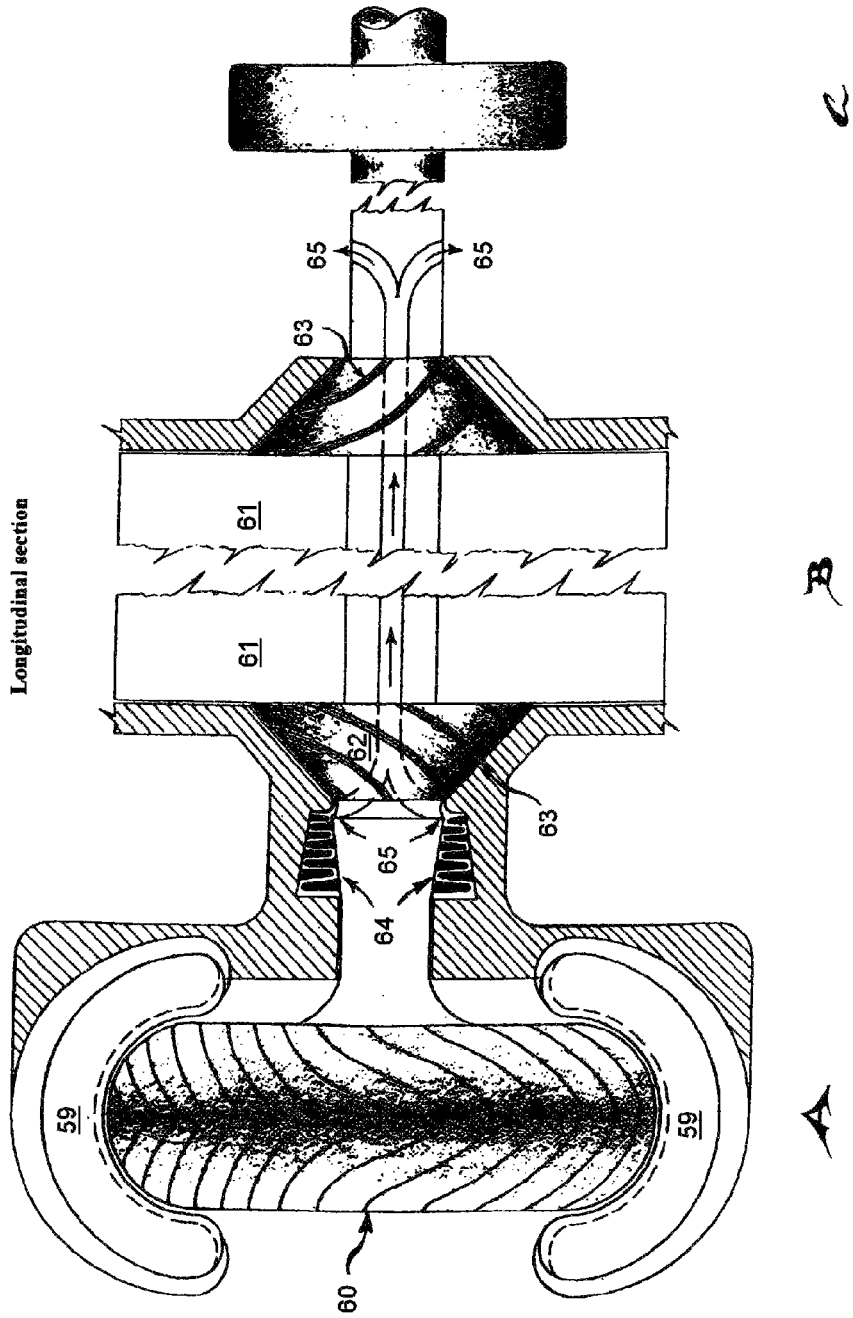
FIG. 9 illustrates exhaust gas flow in a motor according to the invention.

FIG. 9 "Longitudinal Section" and Legend

The three-phase electric motor of variable frequency without sliding frictions is a booster of axial dynamic energy to be used.

The electric motor with the magnetic field contributes to hold in the center the axis of the combustion engine, so as to have a perfect axial magnetic self-centering.

In the particular figure of the stator (59) and the rotor (60) of the electric motor can be see the construction of the opposed peripheral surfaces of stator/rotor sliding, which have a semicircular section.

The rotor is a squirrel cage rotor (60), but it wraps oneself up on a toroidal ring having the external peripheral cage like a ploughshare or a bow of a boat, so it is immersed in the three-phase magnetic field of the stator. By this way the stator magnetic force links up with the rotor in the best way through an advanced penetration.

This fact is more favorable in case of high frequencies and high speed of rotation.

The higher the stator excitation is, the greater the induced force transmitted to the rotor is, and this force causes a magnetic self-centering of the rotor.

The three-phase power motor is also a starter, because it is used for the starting of the Rotodin by taking the electric energy accumulated in the thermionic cells.

4) Motor Pump

FIG. 4 "Longitudinal Section", FIGS. 18-19 "Longitudinal Section", FIG. 20 "Cross Sections and Legends In the three-phase kinematic motor pump of variable frequency and frictionless the rotor is immersed in the cooling fluid and during rotation it creates a motion that does not depend on the cause that produces it. This motion is skidding, frictionless, self-centering towards the stator. Therefore an action produces a fluid bearing. The rotor, which is hollow at the axial center, creates a conveyor conduit having inside a helical runner for the fluid thrust. The kinematic motor pump is used in the thermionic Rotodin for the re-circulation of thermal energy. Its revolutions are controlled by an electronic gearcase (FIG. 11 "Electric synoptic diagram", n° 11 and legend), depending on the operational temperature of the whole generating system.

5) Electric Cooling Fan

FIG. 4 "Longitudinal Section", reference number 14 and Legend

The three-phase electric cooling fan of variable frequency is used for the refrigeration of the thermionic cells and motors. The electric cooling fan is controlled by an electronic gearcase (80 at FIG. 11 "Electric synoptic diagram" and legend), depending on the operational temperature of the whole generating system. When the electric cooling fan is working, it creates a pneumatic overpressure in the whole circuit of circulating refrigeration inside the insulating shell. By this way the thermoenergetic recovery in the transit from the front compartment—at room temperature—to the back compartment collects thermal energy while cooling the thermionic cells and motors. Therefore at the back compartment we can find a higher and more concentrated raising temperature with pressure. High temperature and pressure introduced into the opening of the turbosupercharger favor feeding and so they cause a further increase in pressure in the combustion chamber of the Rotodin and an increase in the axial torsional force.

The electric motor of the electric cooling fan is constructed as the opposite of the normal motors, because the rotor in the center is static and the stator with three-phase windings is fixed. The rotary part is outside the magnetic peripheral vortex.

The squirrel cage rotor has the blades of the helical fan on the axis line at the center of the electric motor, so that the longitudinal axial space of the rotor is reduced.

6) Turbosupercharger

FIG. 4 "Longitudinal Section", reference number 15 and Legend

The turbine is supplied with the exhaust gas coming from the evaporator (17) and the gas is sent to the scroll sound waves damper conveyer (18). The supercharger is a supercharging turbine compressing the air coming from the pressurized back compartment and introduced into the injector.

7) Carburetion Injector

FIG. 4 "Longitudinal Section", reference number 16 and Legend

The carburetion injector makes a mixture of air and fuel (hydrocarbons and/or $H_2O$ vapor) highly pressurized, so it is a feeder supercompressed by the supercharger together with the electric cooling fan of the Rotodin combustion chamber.

8) Evaporator

FIG. 4 "Longitudinal Section", reference number 17 and Legend

The evaporator is pressurized. The burnt gasses escaping from the Rotodin at high temperature are soon introduced into the pressurized evaporator. The great thermal exchange produces vapour, which is made of $H_2O$ molecules, whose distance depend on the temperature which stress them and at the same time a high pressure is produced.

The evaporator at the base is supplied with water having a pressure superior to the one of the accumulation operational tank. At the top of the evaporator it is taken the produced vapor and it is introduced into the carburetion injector (16), in order to supply the Rotodin with the right flux regulation.

In order to start the cold energetic productive unit with $H_2O$ vapor, it is possible to install in the boiler—for vapor production—an electric resistance, which is fed by the thermionic cells and situated at the base inside a pipe that is open at the top and at the base, vertically positioned, so as to produce quickly a little quantity of vapour. Therefore we have a minievaporator inside the boiler as a thermal concentrated image, while the other content of the evaporator remains semi-cold for a short time.

9) Scroll Sound Waves Conveyor

Figure 21:
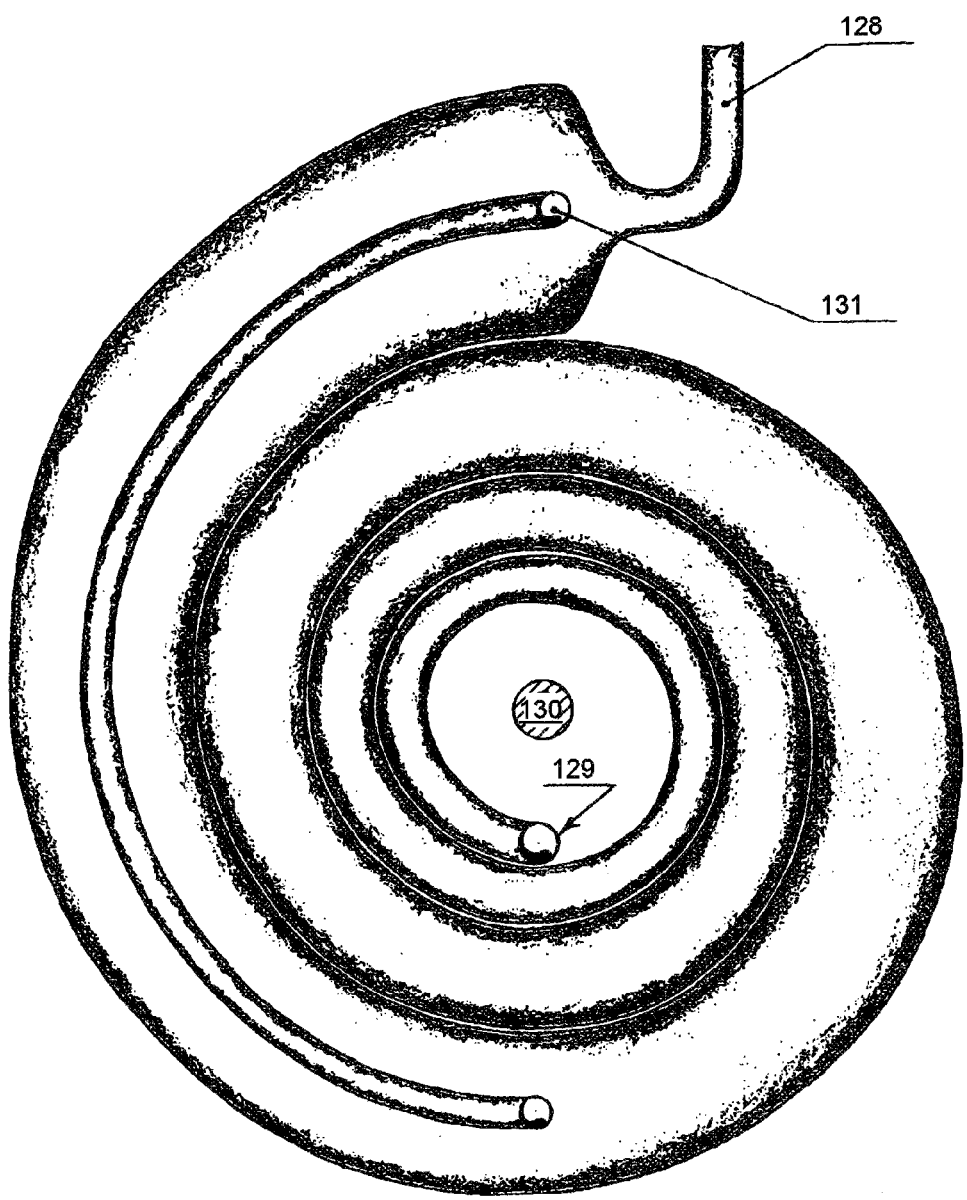
FIG. 21 illustrates a scroll sound wave conveyor in a motor according to the invention.

FIG. 4 "Longitudinal Section", reference number 18 and Legend and FIG. 21 "Section Plane" and Legend The scroll sound waves conveyer conveying the exhaust gas is characterized by a converging conic scroll vortex and it is a considerable damper of sound waves escaping from the Rotodin combustion chamber. Then it recycles contemporaneously the thermal energy in transit into it through an internal ringed manifold which works as an absorber, in order to feed the thermal exchange in the thermionic cells.

10) Check Valve

FIG. 4 "Longitudinal Section", reference number 19 and Legend

The check valve is necessary to introduce $H_2O$ into the pressurized evaporator and it is indispensable for water loading, whose pressure must be superior to the one into the working 11) Double Semicircle Throttle FIG. 4 "Longitudinal Section", reference number 20 and Legend It is a throttle formed as a double semicircle necessary for the regulation of thermal energy pressurized in re-circulation.

12) Frequency Generator

FIG. 4 "Longitudinal Section", reference number 21 and Legend

On the external surface of the insulating shell of the whole thermionic Rotodin you can see horizontally on the axis of the rotary engine a three-phase generator of variable frequency having the phases displaced of 120.° and the rotor which is a permanent magnet with two poles. As soon as the axis of the Rotodin reaches 100,000 revolutions per minute, the generator will produce a three-phase frequency of Hz 1.66,666 on the basis of the following formula:

$$f = \frac{P \times n}{60} = \frac{100.000}{60} = \text{Hz } 1.666,66$$

$$f = \text{Frequency}$$

$$P = n. \text{ of Poles}$$

$$n = \text{number of revolutions}$$

$$60 = \text{seconds}$$

The frequency generator is a magnetic step-by-step reader. Therefore it can check precisely the radial angle of the axial revolutions of the Rotodin. The frequency generator (78 at FIG. 11 "Electric synoptic diagram" and legend) controls and perceives in every time the precise number of revolutions made by the rotary engine, therefore it controls the inverters (*) of variable frequency of the three-phase power circuit.

The electronic system consists of three mono-phase inverters displaced of 120°, which process the bipolar energy in direct current—supplied by the storage-generator thermionic cells—and transform it into three-phase energy of variable frequency, which supplies the whole three-phase power system.

(*) Note Regarding the Operational Energetic Productive Unit

Figure 11:
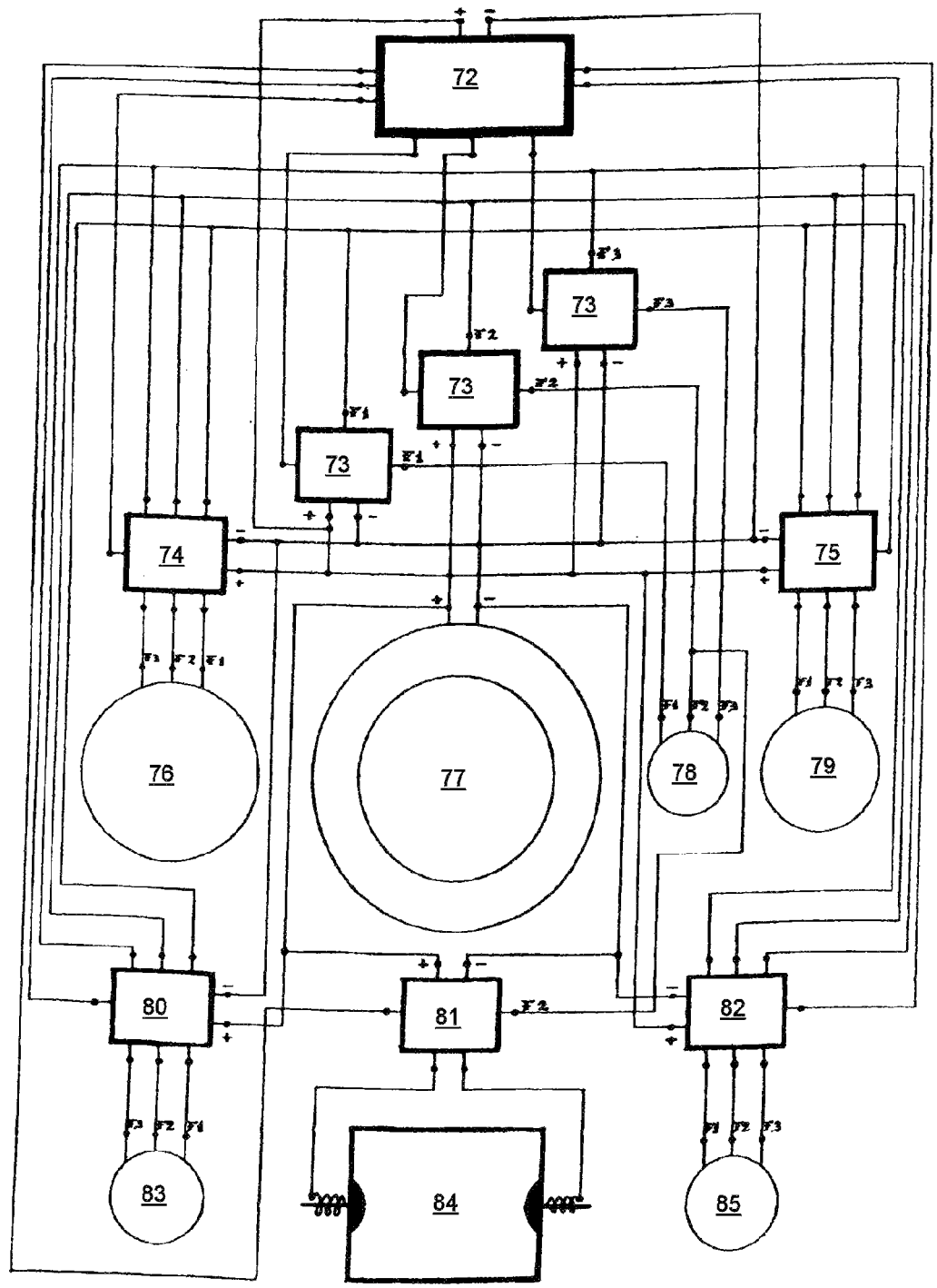
FIG. 11 illustrates an electric synoptic diagram in a motor according to the invention.

FIG. 11 "Electric Synoptic Diagram"

In case the inverter is constructed for the transit of current in both directions, the alternate current overproduced by the reducer (79) and not completely absorbed by the ring of users can transit into the inverter in the opposite direction and be transformed into direct current energy, which can be accumulated in the thermionic cells.

13) Speed Reducer

Figure 22:
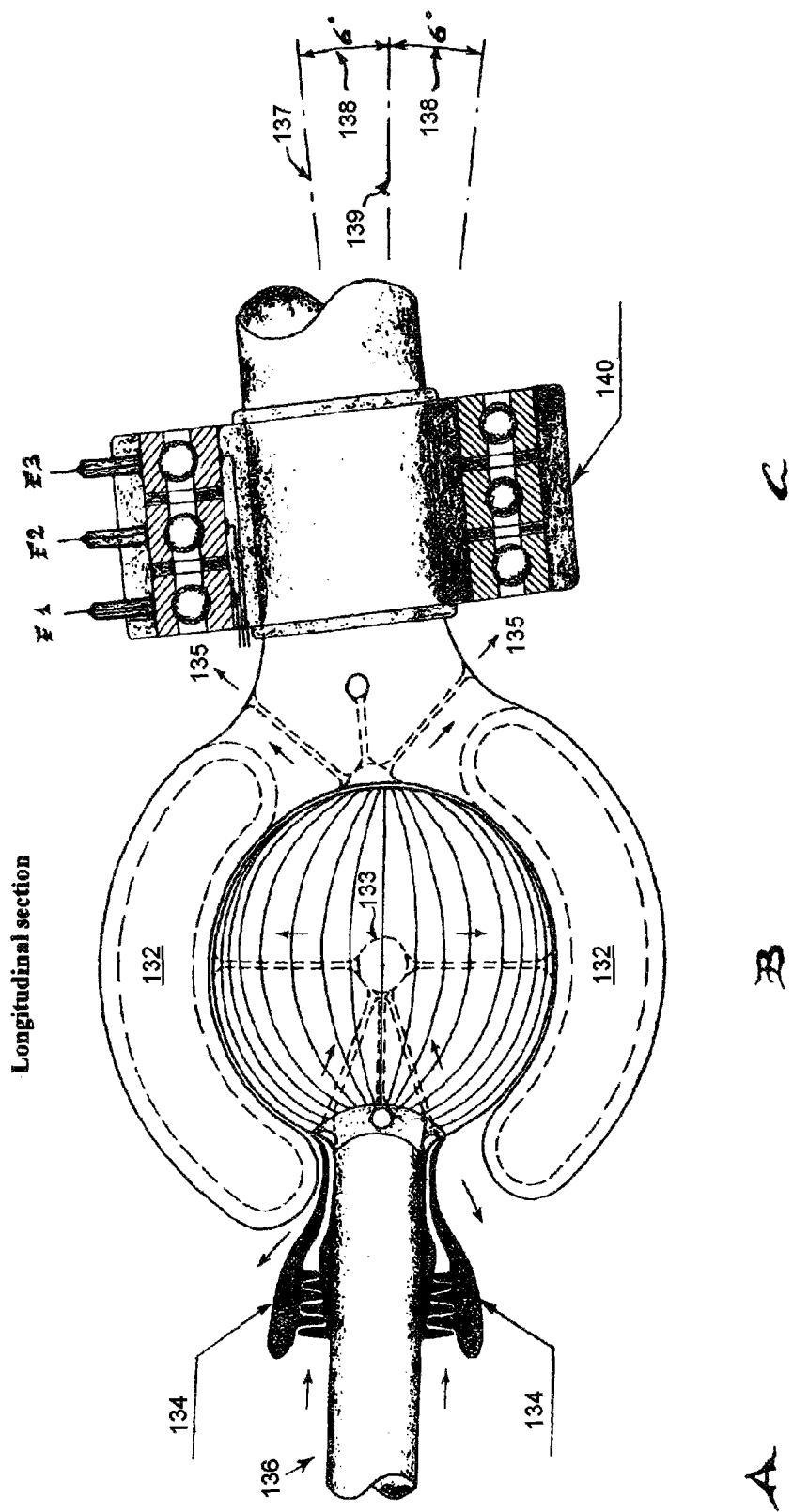
FIG. 22 illustrates a magnetic slipping speed reducer working as a frictionless self=centering spherical vortex in a motor according to the invention.

FIG. 4 "Longitudinal Section," reference number 22 and Legend,

FIG. 22 "Longitudinal Section" and Legend

The magnetic slipping speed reducer is controlled by an electronic system (75 at FIG. 11 "Electric synoptic diagram" and legend).

It checks the stator magnetic field to determine the revolutions to be used on the secondary axis that are controlled by a magnetic reader of revolutions.

When the speed reducer is working, the following phenomenon occurs: the slipping causes a generation of electric energy; so a greater slipping—with a considerable force to be transferred from the primary axis to the secondary one—causes a greater production of alternate current, which comes back closing itself like a ring and goes towards the three-phase power motor, the motor pump, the electric cooling fan and the thermionic cells.

Therefore it is created an automatic energetic balancing.

As the power to supply on the axis of the Rotodin changes, there is also a change in the energy generated by the speed reducer. In such a case the speed reducer works just as it was a generator, while the electric power motor, the motor pump, the electric cooling fan and the thermionic cells work as users.

In conclusion, the electric power motor, the motor pump, the electric cooling fan automatically and partially are self-fed by the conduction ring of energy in a closed recycle, while the quantity of energy lacking on the ring is supplied by the thermionic cells.

All this must be regulated by a centralized computerized electronic system depending on the requested dynamic energy to supply to the secondary axis.

Exhaust Gas Condenser

I did not make any drawing of the condenser, because its installation is optional and its construction is simple. It depends on the autonomy requested or necessary to the locomotive vehicle or other. Therefore if we want a long autonomy of work of the whole productive energetic unit, we must take the exhaust gas and introduce it into the condenser located outside and next to the fan of the front compartment.

The drop in temperature occurring in the condenser is due to the electric cooling fan, which sucks up the air at room temperature.

The electric cooling fan collects a percentage of thermal energy which comes back again in the vortex of thermal recycle inside the insulating shell.

Therefore, in the condenser, which works at decreasing temperature, the atoms of hydrogen and oxygen form again molecules of $H_2O$ water, which are introduced again into the evaporator. So the performances of autonomy increase a lot, even if we have a limited fuel stock and it will be reduced a lot the loss of gas emission.

Brief Summary of the Entire Hybrid Energetic Unit System

The system develops a thermo-expanding vortex of torsional thermodynamic rotary energy at increasing and/or constant temperature. From the thermionic cells it is taken thermoconductive energy at dropping temperature.

In conclusions, we have a closed thermodynamic-ionic recycle with a minimum thermal loss.

CONCLUSIONS

In the course of my studies going back in time, through centuries of history, from the beginning of the technologic evolution up to now—in order to understand better the past, so as to project a better future—, I am astonished at the work made by Barsanti and Matteucci, the first inventors of the internal combustion engine.

They realized that the expansion of an exploded gas could generate a motion of the piston, so as to substitute the vapor expansion, which at that time was the only primary source of thermodynamic motion. Barsanti and Matteucci were the pioneers of a change, that is, a change in giving a very advanced motion of high technology to means of transports of earth, water, and sky, just as we can see nowadays.

The frictionless thermionic Rotodin is a hybrid productive energetic unit supplied with vapour, that is, hydrogen and oxygen; therefore it is a throwback to the origins, to the use of vapour, but with a very high technology using the atomic fission of the molecule.

The descendants of the future young people will judge the huge change impressed by the thermionic Rotodin, which can generate energy without releasing polluting substances in the atmosphere, because it is supplied with fuel introduced into a closed atomic recycle, where both a molecular fission and a molecular re-composition take place. Because nothing is created, nothing is lost, but the atom remains unchangeable forever.

The hybrid productive energetic unit of the thermionic Rotodin consists of a static part, constituted by the thermionic cells, and a rotary part, which is the frictionless electro-thermodynamic Rotodin, which does not need lubrication oil, therefore it reduces the operational costs and eliminates oil leakage and oil polluting combustions to the outside.

The frictionless feature of the Rotodin favors an unlimited life of construction and work in the time, because the engine has not touching sliding surfaces that could wear out, therefore it does not need periodic works of maintenance.

The water fuel, that is, atoms of hydrogen-oxygen, distributed into a closed recycle, are taken again at the exhaust and introduced again at the entry through a supercharged injection, so they generate a concentrated energetic vortex with the lowest quantity of thermo-atomic loss. By this way the duration of work of the productive energetic unit will be highly increased with a minimum stock of fuel.

The Rotodin can have many types of realization. I will report only three in particular:

1) We can position in a line on the same axis 3 rotors having the strokes displaced of 120°, so that the axis receives a complete torsional force all over the cycled revolution of 360°.

2) The rotor, conceived to work at low speed, can have a lot of cavities and at the same time more active explosion chambers working per every revolution.

3) If the energetic productive unit does not need to transmit the axial torsional energy for any use, this unit can also be static without any rotary parts with a static explosion chamber which consists of a crucible. The crucible works as it were in a partial state of plasma in a thermal contractive concentration with a magnetic focusing and, contemporaneously, a spark gap focusing, in order to produce thermal energy for numberless uses, one of which is supplying with the produced heat the storage-generator thermionic cells used for the production of electric energy.

The exceeding thermal energy produced by the thermionic Rotodin can be used for heating and air conditioning of buildings or for water heating for sanitary use or for several other uses: industry, agriculture and all other sectors where we need electric, thermal and dynamic energy.

The thermionic Rotodin can be used for all earth, water and sky transports.

As regards the motor transport the propulsive thermionic Rotodin system simplifies vehicles a lot and eliminates several components which are now installed on the existing means.

The articulated magnetic sliding speed reducer substitutes the current change gear; the clutch is not necessary, therefore it is eliminated every energetic loss due to frictions.

Besides the speed reducer can step up the breaking system.

The battery is eliminated, because the storage-generator thermionic cells supply electric energy.

While operating the propulsion of the thermionic Rotodin—depending on the requested energy—works so that the Rotodin and the electric motor of power can work alternatively.

The electric motor of power can supply dynamic energy and the Rotodin can be disconnected from the fuel or the opposite can occur, if in a moment the accumulation of electric energy in the thermionic cells is lacking, the Rotodin will supply thermal energy to the thermionic cells, so that the emission of energy is balanced.

The security of the mean increases a lot, because in case of accident or in other cases, on board there is no fuel stock with manipulating inflammable installations.

The fire danger of the energetic productive unit of the thermionic Rotodin is impossible, because the comburent, hydrogen, and the oxidizer, oxygen are united in a molecular formation outside the combustion chamber and they separate only inside it, when the molecular fission takes place.

The thermionic cell has unlimited uses. I will list here below some of them.

It can be a booster of energetic power given by photovoltaic panels, so that on the same surface the photothermic solar radiation feeds the photovoltaic cells and at the same time the thermionic cells, where the energy accumulated in the day (in the day-night alternating period) is given back in the night when we have no solar radiation. By this way we have surely a continuous supply of energy proportional to the installed power of the system.

The thermionic cell can also be installed on an industrial machine and generally in all those cases where we have a dissipation of heat: for example, in case of insulating panels collecting heat.

The thermionic cell can also be installed on stoves or fireplaces or other. It can be applied to all white goods: washing machines, refrigerators, electric ovens, etc., by collecting the dissipation of heat produced.

It can be used also for electronic appliances: computers, televisions, radios and the whole electronic sector, in general, in the electromechanical sector, in electric motors, alternators, etc.

It is possible to produce thermionic cells in bendable panels, which can be suited for a lot of uses, because the anode consists of an alkaline fluid and the electrolyte can be a soft semisolid.

Therefore, the thermionic Rotodin and photothermionic cell panels or only thermionic cells give rise to a big industrial revolution in the energy sector, which will give the greatest benefits to humanity.

The pollution problem will not exist anymore, because hydrocarbons will be used only for manufactured products or necessary chemical substances, and they will not be used anymore for the combustion of great quantities requested to produce thermal, thermoelectric or thermodynamic energy.

In the next future is really possible to produce electric energy where it is requested without any transport.

It is sufficient to install the hybrid thermionic Rotodin or photothermionic cell panels or only thermionic cells with the aim to eliminate gradually all lines of transport, primary cabins and power plants which manipulate great quantity of energy on the plants generating big losses.

At the moment the loss is balanced by a greater superior production of energy from power plants that the user is obliged to pay.

The electric energy is not a visible material to notice, because it is made of electrons/ions of invisible force, but in the future it will be possible with very high technologies to collect and control this force better in comparison to nowadays.

It will happen something such as we can already see in case of cellular phones. The fixed phone network of the last mile could be eliminated in the future. At the moment we are trying to use the digital counter, which the electric companies have recently installed for digital multipurpose connections of houses etc.

In many areas of the world without electricity they can use, when they want, an individual system of electric generation made of a hybrid thermionic Rotodin and photothermionic cell panels or only storage-generator thermionic cells.

The thermionic Rotodin—installed as a propulsor on railroad and tramway locomotives—makes the train or tram self-contained and at the same time supplied with electric energy for all auxiliary and necessary uses of the carriages of the whole train or tram.

Therefore, with time if the train or tram fleet will be renewed through the installation of the thermionic Rotodin the railroad or tramway electric network could be eliminated in the future, and all operational, maintenance and energy supplying costs could be cancelled as well as the waste of energetic transport, so that the only railway management will remain.

The thermionic Rotodin is surely also a naval propulsor and it does not need a fuel stock, because it floats on hydrogen and oxygen.

Then it is also an air propulsor working with a minimum fuel stock circulating in an atomic closed recycle. It has a long air fuel distance.

The ballasts of engines and appliances are reduced a lot, because the hybrid thermionic Rotodin is a concentrated unit which supplies contemporaneously electric and dynamic energy at a very high rotary speed. Therefore it is reduced a lot the weight of the propulsor in comparison to the supplied power.

In conclusion, it is unthinkable a future where a request of energy higher and higher shall counterbalance works greater and greater, which cause an environmental impact more and more with an useless degradation of the territory, and consequently, an increase in public costs that will be paid by the people.

Therefore the hybrid thermionic Rotodin and phototermionic cell panels or only storage-generator thermionic cells allow such an advance in technology as well as the right respect for the earth such as it has been created.

DESCRIPTION OF THE DRAWINGS

FIG. 3 Legend

Various Sequences of Dynamic Force Directions in a Peripheral Vortex to Cause a Rotary Motion I—Entry: force having a contractive speed and bumping into the center if the cavity R—Radial: dynamic force having a circular speed caused by the peripheral vortex U—Exit: force having an expanding speed sliding into the helical cavity F—Optimal phase, where the contemporaneous action of three forces I-R-U takes place; these forces produce a rotary motion, so as to improve the axial efficiency

FIG. 4 Legend

Thermionic Rotodin

Frictionless Hybrid Rotary Engine Working as an Electro-Thermodynamic Vortex Action 10: Rotodin, generator of thermodynamic power
11: Thermionic cells: storage-generators of electric power
12: Three-phase electric motor of variable frequency, integrator of dynamic power
13: Three-phase motor pump of variable frequency for the re-circulation of exchange of thermal energy
14: Three-phase electric cooling fan of variable frequency for the refrigeration of the thermionic cells and motors
15: Turbosupercharger
16: Feeder, carburetion injector, injector of hydrocarbons and/or $H_2O$ vapour
17: Evaporator of $H_2O$ pressurized
18: Sound waves damper conveyor characterized by a scroll vortex with thermal energy recovery
19: Check valve to introduce $H_2O$
20: Regulating double semicircle throttle for the re-circulation of thermal energy
21: Variable frequency three-phase generator
22: Three-phase electric speed reducer of variable frequency
23: Exhaust gas condenser
24: Insulating shell, container of thermal energy

FIG. 5 Legend

Thermionic Rotodin

Cross Section

25: Thermionic cells: storage-generators of electric power
26: Thermoconductive fluid for thermoenergetic recovery
27: Stator with cavities characterized by a facing toothing on the periphery of the vortex
28: Rotor whose force wraps round the axis
29: Loading stroke chamber
30: Explosion stroke chamber
31: Exhaust stroke chamber
32: Loading port
33: Anode with magnetic spark gap head
34: Exhaust port

FIG. 6 Legend

Loading Stroke

Longitudinal Section

35: Sectioned stator: internal view
36: Entire rotor with cavity inclined of 10°
37: Combustion chamber working as a torsional vortex
38: A-B: loading port of the rotor
39: Thermoconductive fluid for thermoenergetic recovery
40: Cavities at the periphery of the vortex
41: Injector used to introduce hydrocarbons and/or $H_2O$ vapour
42: Angular motion of the rotor rotation
43: Angle of incidence in the center of the cavity (45°+10°)

FIG. 7 Legend

Explosion Stroke

Longitudinal Section

44: Sectioned stator: internal view
45: Entire rotor with cavity inclined of 10°
46: Combustion chamber working as a torsional vortex interposed between magnetic spark gap anode and cathode
47: Conic beam of magnetic lines of force focusing at the center of the chamber
48: Magnetic ringed narrowing in a partial state of plasma
49: Cavities at the periphery of the vortex
50: Thermoconductive fluid for thermoenergetic recovery
51: High tension transformer in a focusing magnetic conic vortex
52: Gap with polar anode-cathode head of reduced surface

FIG. 8 Legend

Exhaust Stroke

Longitudinal Section

53: Sectioned stator: internal view
54: Entire rotor with cavity inclined of 10°
55: Combustion chamber working as a torsional vortex
56: Thermoconductive fluid for thermoenergetic recovery
57: Exit of the burnt gas from the chamber and its introduction into the tunnel
58: Minimum length of the exhaust tunnel: 50% of the cavity

FIG. 9 Legend

Frictionless Rotary Axis

Longitudinal Section

A) Electric motor
B) Heat engine
C) Frequency generator
59: Stator with semicircular section
60: Self-centering rotor formed as a toroidal ring
61: Rotor of the frictionless thermodynamic engine with a magnetic self-centering
62: Double pneumatic bearing constructed as opposed vortexes
63: Grooves with screwing direction suited for the transit of the exhaust gas
64: Plug microturbine to reverse the direction of the exhaust gas
65: Peripheral holes on the axis which lead to one greater hole at the center

FIG. 10 Legend

Cavity of the Rotor—Electric Arc Striking System

Longitudinal Section

66: Cavity of the rotor with spoon rims in evidence
67: Fuel loading side
68: Exhaust side of burnt gas
69: Electric arc striking system
70: Magnetic spark gap anodic high tension transformer of the North pole
71: Magnetic spark gap cathodic high tension transformer of the South pole

FIG. 11 Legend

Three-Phase Electric Synoptic Diagram of Variable Frequency of the Thermionic Rotodin 72: Computer: driver gearcase for the general control of the whole productive unit generating energy
73: Inverters: three mono-phase electronic components with a phase displacement of 120°
74: Electronic regulator of energy absorbed by the electric motor of dynamic power
75: Electronic regulator for the control of the stator magnetic field of the speed reducer
76: Electric motor of dynamic power
77: Set of thermionic cells: storage-generators of electric energy
78: Generator of three-phase frequency, sensor for revolutions of the axis of the Rotodin
79: Magnetic slipping speed reducer
80: Electronic regulator for the control of revolutions of the electric cooling fan
81: Electronic gearcase for the spark ignition
82: Electronic regulator for the control of revolutions of the kinematic motor pump
83: Electric cooling fan for refrigeration
84: Thermodynamic combustion rotary engine
85: Kinematic motor pump

FIGS. 12-13 Legend

Storage-Generator Thermionic Cell

86: Anode: atomic fluid mass at increasing temperature
87: Cathode: atomic solid mass at decreasing temperature
88: Anodic alkaline fluid fermentation
89: Anode-cathode alkaline solid electrolyte
90: Cavity crossed by air/oxygen causing a cathodic oxidation
91: Manifold: thermoconductive fluid, thermoenergetic dissipator
92: Alkaline regenerated cartridge
93: Exhaust cartridge: ion-exhausted fluid
94: Quick release of cartridges for their substitution

FIGS. 14-15 Legend

Photovoltaic Cell Panels Together with Storage-Generator Thermionic Cells

FIG. 14

Type 1—Linear and Curvilinear Panel Collecting Energy

95: Polymer-based photovoltaic cell
96: Silicon photovoltaic cell
97: Storage-generator thermionic cells
98: Manifold with thermal exchange fluid
99: Parabolic canalization
100: Polarized glass
101: Insulating material

FIG. 15

Type 2—Curvilinear Panel Collecting Energy

102: Curvilinear and polymer-based photovoltaic cells
103: Storage-generator thermionic cells
104: Reflecting parabolic manifold
105: Manifold with thermal exchange fluid
106: Polarized glass
107: Insulating material
108: Solar radiation in antimeridian hours
109: Solar radiation in postmeridian hours

FIGS. 16-17 Legend

Photovoltaic Cell Panels Together with Storage-Generator Thermionic Cells

FIG. 16

Type 3—Linear Panel Collecting Energy

110: Silicon photovoltaic cell
111: Storage-generator thermionic cells
112: Manifold with thermal exchange fluid
113: Polarized glass
114: Insulating material

FIG. 17

Type 4—Thermoconductive Panel Collecting Energy

115: Silicon photovoltaic cell
116: Storage-generator thermionic cells

117: Manifold with thermal exchange fluid
118: Polarized glass
119: Insulating material FIGS. 18-19-20 Legend Frictionless Three-Phase Kinematic Motor Pump of Variable Frequency 120: Squirrel cage rotor: while working it creates a fluid bearing sliding between rotor and stator and self-centering
121: Three-phase stator of variable frequency
122: Blade helical runner at low speed of thrust
123: Blade helical runner at high speed of thrust
124: Rotary supports on slack brass
125: Conduit, distance covered by the fluid with a twisting thrust in a self-centering motion
126: Holes for the fluid exchange between conduit and meatus
127: Meatus: hydrodynamic lubrication space which during the rotary motion wedges in a sliding self-centering pressure

FIG. 21 LEGEND

Scroll Sound Waves Conveyor

128: From the turbosupercharger the exhaust gas is introduced into the scroll sound waves conveyor
129: Exhaust gas escaping outside with damped sound waves
130: Axis of the rotor
131: Manifold collecting thermal energy to feed the thermionic cells

FIG. 22 Legend

Magnetic Slipping Speed Reducer

Longitudinal Section

A) Spherical-meridian squirrel cage rotor
B) Flexible articulated joint formed as a spherical vortex
C) Three-phase sliding support, contactor with spherical bearings
132: Spherical pincers stator with variable motion
133: Canalization inside the spherical rotor for the creation of a pneumatic bearing
134: Miniturbine for the creation of a pneumatic bearing
135: Air outlet from the pneumatic bearing
136: Primary axis on the side of the Rotodin
137: Secondary axis on the side of the user
138: Angle of articulation of the flexible joint in a conic space
139: Primary and secondary axis in a line
140: Bearings insulated by the mass of the structure of the phases F1, F2, F3

The invention claimed is:

1. A motor comprising:
   a combustion chamber;
   a central rotor disposed within the combustion chamber, the central rotor defining an intake chamber, an explosion chamber, and an exhaust chamber within the combustion chamber;
   a shaft engaging the central rotor longitudinally and having a proximal portion and a distal portion extending from the combustion chamber in opposite directions; and
   a proximal rotor and a distal rotor coupled to the shaft in symmetrically opposite positions, the proximal and the distal rotors having passages defined thereon to receive at least some exhaust gas exiting the combustion chamber and to impart a vertical motion to the at least some exhaust gas,
   wherein the at least some exhaust gas in the proximal and the distal rotors is directed to an interspace between the shaft and a housing of the motor, thereby forming a proximal pneumatic bearing and a distal pneumatic bearing between the shaft and the housing, the proximal and the distal pneumatic bearings maintaining the shaft in suspended position during operation of the motor.

2. The motor according to claim 1, wherein the central rotor is configured to cause the intake chamber, the explosion chamber, and the exhaust chamber to be longitudinally inclined, thereby causing a gas within the combustion chamber to move in vertical direction.

3. The motor according to claim 1, wherein the central rotor is housed in a central stator having an inner surface facing the central rotor, further comprising teeth extending from the inner surface of the central stator to define a plurality of peripheral chambers therein.

4. The motor according to claim 3, wherein the teeth are inclined in a direction of rotation of the central rotor.

5. The motor according to claim 1, wherein the proximal and distal rotors have a frustoconical shape with a wider end facing the combustion chamber and a narrower end facing outwardly.

6. The motor according to claim 1, wherein the passages on the proximal and distal rotors are configured as grooves disposed spirally on a lateral surface of the proximal and distal rotors.

7. The motor according to claim 1, wherein a microturbine is disposed in the interspace downflow of the proximal rotor, the microturbine reversing flow direction of the exhaust gas to travel toward a longitudinal conduit in the shaft and further toward an opposite side of the combustion chamber.

8. The motor according to claim 7, wherein a plurality of passages fluidly connect the microturbine to the longitudinal conduit in the shaft.

9. The motor according to claim 1, further comprising an electric motor coupled to the shaft, such to enhance centering of the shaft within the interspace.

10. The motor according to claim 1, further comprising a plurality of energy storage elements disposed adjacently to the combustion chamber, the energy storage elements receiving at least a thermally conductive fluid therethrough, such to accumulate energy received from the thermally conductive fluid.

11. The motor according to claim 10, wherein the energy storage elements are batteries accumulating the energy received as heat of the thermally conductive fluid, and wherein the thermally conductive fluid receives heat from the combustion chamber and at least some exhaust gas.

12. The motor according to claim 10, wherein the plurality of energy storage elements are disposed circumferentially around the combustion chamber.

13. The motor according to claim 1, wherein explosion within the combustion chamber is achieved by focusing a magnetic field within the combustion chamber.

14. The motor according to claim 13, wherein the magnetic field is shaped as a pair of conical beams with contacting apical portions, the magnetic field being focused in the contacting apical portions.

15. The motor according to claim 14, wherein the contacting apical portions are located in a central portion of the explosion chamber.

\* \* \* \* \*

UNITED STATES PATENT AND TRADEMARK OFFICE
CERTIFICATE OF CORRECTION

PATENT NO. : 8,210,150 B2  
APPLICATION NO. : 12/676893  
DATED : July 3, 2012  
INVENTOR(S) : Dino Andreini It is certified that error appears in the above-identified patent and that said Letters Patent is hereby corrected as shown below:

Title Page, Abstract Item (57), line 8: Replace --vertical-- with --vortical--.

Col. 18, line 3, Replace --vertical-- with --vortical--.

Col. 18, line 16, Replace --vertical-- with --vortical--.

Signed and Sealed this  
Fourteenth Day of August, 2012

David J. Kappos  
*Director of the United States Patent and Trademark Office*